US008269653B2

(12) United States Patent
Saunders

(10) Patent No.: US 8,269,653 B2
(45) Date of Patent: *Sep. 18, 2012

(54) PROVIDING SPONSORSHIP INFORMATION ALONGSIDE TRAFFIC MESSAGES

(75) Inventor: Mark Saunders, Naperville, IL (US)

(73) Assignee: Navteq B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,711

(22) Filed: Apr. 6, 2011

(65) Prior Publication Data

US 2011/0181439 A1 Jul. 28, 2011

Related U.S. Application Data

(60) Division of application No. 12/938,472, filed on Nov. 3, 2010, now Pat. No. 7,990,284, which is a continuation of application No. 12/842,450, filed on Jul. 23, 2010, now Pat. No. 7,855,659, which is a division of application No. 12/051,994, filed on Mar. 20, 2008, now Pat. No. 7,791,500.

(51) Int. Cl.
G08G 1/09 (2006.01)

(52) U.S. Cl. ........... 340/905; 340/995.13; 340/539.1; 370/329; 370/466

(58) Field of Classification Search .......... 340/905, 340/995.13, 539.1, 439; 370/329, 466; 455/186.1, 455/414.1, 450, 451; 701/117, 119, 201, 701/211
See application file for complete search history.

(56) References Cited

U.S. PATENT DOCUMENTS

| 5,664,948 | A | 9/1997 | Dimitriadis et al. | 434/307 |
|---|---|---|---|---|
| 5,748,107 | A | 5/1998 | Kersken et al. | 340/905 |
| 6,438,561 | B1 | 8/2002 | Israni et al. | 707/104.1 |
| 6,542,814 | B2 | 4/2003 | Polidi et al. | 701/208 |
| 6,567,658 | B1 | 5/2003 | Van De Graaf | 455/412 |
| 6,587,782 | B1 | 7/2003 | Nocek et al. | 701/200 |
| 6,654,800 | B1 | 11/2003 | Rieger, III | 709/223 |
| 7,089,264 | B1 | 8/2006 | Guido et al. | 707/104.1 |
| 7,136,915 | B2 | 11/2006 | Rieger, III | 709/223 |
| 7,203,598 | B1 | 4/2007 | Whitsell | 701/210 |
| 7,266,443 | B2 | 9/2007 | Hirose | 701/117 |
| 7,346,029 | B2 | 3/2008 | Lee | 370/329 |
| 7,499,683 | B2 | 3/2009 | Ogasawara | 455/132 |
| 2002/0013656 | A1 | 1/2002 | Namba | 701/200 |
| 2002/0021674 | A1 | 2/2002 | Thorne et al. | 370/252 |
| 2003/0129981 | A1* | 7/2003 | Kim | 455/436 |
| 2005/0071081 | A1 | 3/2005 | Hirose et al. | 701/210 |

(Continued)

FOREIGN PATENT DOCUMENTS

EP 1684250 A2 7/2006

Primary Examiner — Hung T. Nguyen
(74) Attorney, Agent, or Firm — Frank J. Kozak; Jon D. Shutter; Adil M. Musabji

(57) ABSTRACT

A method and system for providing sponsorship information to a user of a traffic message receiver is disclosed. Sponsorship messages are sent to the traffic message receiver and include data to be stored in the memory of the receiver. The transmission of the sponsorship messages is performed as a background routine to the regular transmission of traffic messages. The sponsorship data stored in the traffic message receiver is provided to the user of the traffic message receiver based on a triggering event, such as the end-user entering a point of interest string into the user interface of his navigation system or receipt of a message that includes an activated trigger flag.

11 Claims, 8 Drawing Sheets

U.S. PATENT DOCUMENTS

| | | | |
|---|---|---|---|
| 2005/0099323 A1* | 5/2005 | Hirose | 340/995.13 |
| 2005/0148325 A1 | 7/2005 | Kopra et al. | 455/420 |
| 2005/0240340 A1 | 10/2005 | Ishikawa et al. | 701/117 |
| 2005/0266814 A1 | 12/2005 | Steelberg et al. | 455/186.1 |
| 2006/0031012 A1 | 2/2006 | Okamoto | 701/213 |
| 2006/0178807 A1* | 8/2006 | Kato et al. | 701/117 |
| 2006/0270449 A1 | 11/2006 | Kim et al. | 455/552.1 |
| 2007/0152844 A1 | 7/2007 | Hartley et al. | 340/905 |
| 2007/0259634 A1 | 11/2007 | MacLeod et al. | 455/186.1 |
| 2007/0294023 A1* | 12/2007 | Arcot et al. | 701/117 |

* cited by examiner

| x4 | x3 | x2 | x1 | x0 | rfu | rfu | COUNT | POI ID | SPONSOR | TEXT/PHONEME CHAR. | y15 | y14 | y13 | y12 | y11 | y10 | y9 | y8 | y7 | y6 | y5 | y4 | y3 | y2 |
|---|---|---|---|---|---|---|---|---|---|---|---|---|---|---|---|---|---|---|---|---|---|---|---|---|---|
| 0 | 0 | | | | rfu | rfu | COUNT | POI ID | SPONSOR | 1,5,9,13 | | | | | | | | | | | | | | | |
| 0 | 1 | | | | rfu | rfu | COUNT | POI ID | SPONSOR | 1,5,9,13,17,21,25,29 | | | | | | | | | | | | | | | |
| 1 | 0 | | | | rfu | rfu | COUNT | POI ID | SPONSOR | 1,5,9,13,17,21,25,29 | | | | | | | | | | | | | | | |
| 1 | 1 | | | | rfu | rfu | rfu | rfu | rfu | rfu | rfu | rfu | rfu | rfu | rfu | rfu | rfu | rfu | rfu | rfu | rfu | rfu | rfu | rfu | rfu |

302 — COUNT
304 — POI ID
306 — SPONSOR
308 — (row indicator)
310 — TEXT/PHONEME CHAR.
300

| y1 | y0 | z15 | z14 | z13 | z12 | z11 | z10 | z9 | z8 | z7 | z6 | z5 | z4 | z3 | z2 | z1 | z0 |
|---|---|---|---|---|---|---|---|---|---|---|---|---|---|---|---|---|---|
| TEXT/PHONEME CHAR. | | | | | | | | | | TEXT/PHONEME CHAR. | | | | | | | |
| 2,6,10,14 | | | | | | | 3,7,11,15 | | | | | | | 4,8,12,16 | | | |
| 2,6,10,14,18,22,26,30 | | | | | | | 3,7,11,15,19,23,27,31 | | | | | | | 4,8,12,16,20,24,28,32 | | | |
| 2,6,10,14,18,22,26,30 | | | | | | | 3,7,11,15,19,23,27,31 | | | | | | | 4,8,12,16,20,24,28,32 | | | |
| rfu | rfu | rfu | rfu | rfu | rfu | rfu | rfu | rfu | rfu | rfu | rfu | rfu | rfu | rfu | rfu | rfu | rfu |

FIG. 6

| x4 | x3 | x2 | x1 | x0 | y15 | y14 | y13 | y12 | y11 | y10 | y9 | y8 | y7 | y6 | y5 | y4 | y3 | y2 | y1 | y0 |
|---|---|---|---|---|---|---|---|---|---|---|---|---|---|---|---|---|---|---|---|---|
| | ODA GROUP | | | | TRI | | POI ID | | | | | ACTIVE | | UP TO 256 MARKETS | | | | | | |
| | | | | | | | | | | | | | | MARKET ID | | | | | | |
| 1 | 1 | 0 | 0 | 0 | 0 | 0 | | | | | | | | | | | | | | |

322 — ODA GROUP
324 — TRI
326 — POI ID
328 — ACTIVE
330 — MARKET ID
320

| z15 | z14 | z13 | z12 | z11 | z10 | z9 | z8 | z7 | z6 | z5 | z4 | z3 | z2 | z1 | z0 |
|---|---|---|---|---|---|---|---|---|---|---|---|---|---|---|---|
| | | | | | | ASSIGNED AID | | | | | | | | | |
| 1 | 1 | 0 | 0 | 0 | 1 | 1 | 0 | 1 | 1 | 0 | 0 | 0 | 0 | 1 | 1 |

332 — ASSIGNED AID

FIG. 7

PROVIDING SPONSORSHIP INFORMATION ALONGSIDE TRAFFIC MESSAGES

CROSS REFERENCE TO RELATED APPLICATION

The present patent application is a divisional application of U.S. patent application Ser. No. 12/938,472 filed on Nov. 3, 2010, now U.S. Pat. No. 7,990,284. U.S. patent application Ser. No. 12/938,472 is a continuation application of U.S. patent application Ser. No. 12/842,450 (issued as U.S. Pat. No. 7,855,659), which was filed Jul. 23, 2010. U.S. patent application Ser. No. 12/842,450 is a divisional application of U.S. patent application Ser. No. 12/051,994 (issued as U.S. Pat. No. 7,791,500), which was filed Mar. 20, 2008. The full disclosures of U.S. patent application Ser. Nos. 12/051,994, 12/842,450, and 12/938,472 are incorporated herein by reference.

FIELD

The present invention relates generally to providing sponsorship and other information to users of traffic message receivers using a traffic message channel.

BACKGROUND

In some areas, systems broadcast data messages that contain up-to-the-minute reports of traffic and road condition information. These systems broadcast the traffic data over traffic message channels on a continuous, periodic, or frequently occurring basis. Traffic message receivers decode the data and provide up-to-the-minute reports of traffic and road conditions.

These traffic broadcast systems have several advantages over radio stations that simply broadcast audio traffic reports. For example, with the traffic broadcasting systems, a driver can obtain the traffic information quickly. The driver does not have to wait until the radio station broadcasts a traffic report. Another advantage of the traffic broadcast systems is that the driver does not have to listen to descriptions of traffic conditions for areas remote from his or her location. Another advantage of the traffic broadcast systems is that more detailed and possibly more up-to-date information can be provided.

One protocol for broadcasting traffic messages is the Traffic Message Channel (TMC), which is used in Europe, North America and elsewhere. In Europe TMC is broadcast as part of the Radio Data System (RDS) and North America TMC is broadcast as part of the Radio Broadcast Data System (RBDS). Essentially RDS and RBDS are identical. Another traffic broadcast system, named Vehicle Information and Communication System ("VICS") Center, is used in Japan. Traffic and road condition information can also be transmitted using other protocols (such as Traffic Experts Protocol Group (TPEG)) and on other broadcast bearers including Digital Audio Broadcasting ("DAB"), Digital Multimedia Broadcasting ("DMB"), Hybrid Digital Radio ("HD Radio"), Digital Radio Mondiale (DRM), satellite radio, and other protocols and radio systems, such as MSN-Direct.

In these systems, the traffic data messages conform to one or more pre-established specifications or formats. The traffic message receivers decode the traffic data messages using these pre-established specifications or formats.

The collection, processing and transmission of traffic information is costly, and hence provision is made within RDS-TMC and other protocols and systems for encrypting the information, rendering it useless until a receiving device has been authorized to decrypt the information, usually on payment of a subscription.

It may be desirable to provide other alternatives to subscriptions as a means of funding the provision of a traffic information service. One method is to include advertisements, the names of the sponsors for the advertisements, information regarding the sponsors (e.g., locations, hours of operation, press releases), and other sponsorship information alongside the traffic information. However, it is difficult to provide this sponsorship information using the traffic message channel itself, due to bandwidth limitations and limits as to what can be transmitted as part of the traffic message protocol. Thus, it would be beneficial to provide a means of transmitting sponsorship and similar messages alongside RDS-TMC information, and presenting the sponsorship information to the end-user via the traffic receiver as an alternative to a subscription-based business model.

SUMMARY

A method and system for providing sponsorship and other information alongside traffic messages is disclosed. A traffic broadcast system transmits a series of messages to a traffic message receiver. These messages include data to be stored in the memory of the receiver. The transmission of sponsorship messages is performed as a background routine to the regular transmission of traffic messages. Over a period of time, the background routine updates the memory of the receiver to include sponsor names, sponsorship messages, and other details relevant to the current reception area.

The sponsorship data stored in the traffic message receiver is presented to the user of the receiver based on a triggering event. In one example, the user triggers the presentation of the sponsorship information by entering a point of interest category into the user interface of his navigation system. The receiver determines from the stored data which sponsor is active for that point of interest category. The receiver retrieves the sponsorship information stored for the active sponsor and presents this information to the user of the receiver.

In another example, the traffic broadcast system transmits a message that includes a trigger flag. The message also identifies a point of interest category and the active sponsor for that category. Upon receipt of the trigger message, the traffic message receiver retrieves the information stored for the active sponsor for the identified point of interest category and presents this information to the user of the receiver.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 6 depicts a message format for a message transmitted to the receiver, as shown in FIG. 2, according to an example;

FIG. 7 depicts another message format for a message transmitted to the receiver, as shown in FIG. 2, according to an example;

DETAILED DESCRIPTION

I. Traffic Broadcast System Overview

Figure 1:
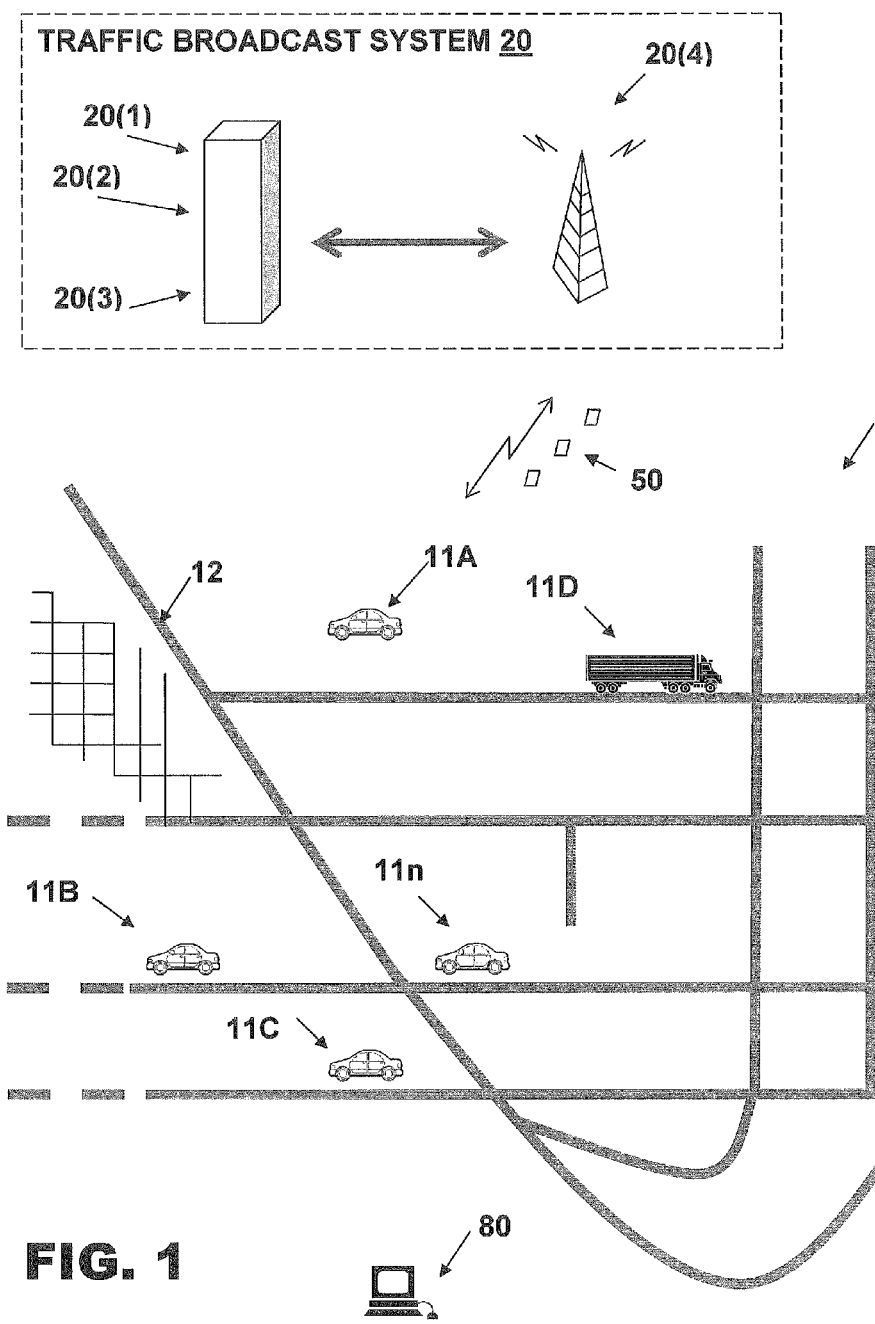
FIG. 1 is diagram illustrating components of a traffic broadcast system in a geographic region, according to an example.

FIG. 1 is diagram illustrating a region 10. The region 10 may be a metropolitan area, such as the New York metropolitan area, the Los Angeles metropolitan area, or any other metropolitan area. Alternatively, the region 10 may be a state, province, or country, such as California, Illinois, France, England, or Germany. Alternatively, the geographic region 10 can be a combination of one or more metropolitan areas, states, countries, and so on. Located in the region 10 is a road network 12.

A traffic broadcast system 20 is also located in the region 10. The traffic broadcast system 20 broadcasts data 50 regarding traffic and road conditions in the region 10, sometimes referred to as traffic messages. As described with respect to FIGS. 6-9, the traffic broadcast system 20 also broadcasts data 50 regarding sponsorship and other information, sometimes referred to as sponsorship messages. The traffic broadcast system 20 may be operated by a governmental organization or may be privately operated. The traffic broadcasting system 20 conforms to a traffic message channel protocol, such as TMC, carried over RDS, RBDS, VICS, DAB, DMB, DRM, HD Radio, and so on.

Vehicles 11(A), 11(B), 11(C), 11(D) . . . 11(n) travel on the road network 12 in the region 10. The vehicles 11 may include a variety of cars, trucks, and motorcycles. Some or all of the vehicles 11 include suitable equipment that enables them to receive the data 50 broadcast by the traffic broadcast system 20.

The data 50 broadcast from the traffic broadcast system 20 may also be received and used in systems 80 that are not installed in vehicles (referred to herein as "non-vehicle systems"). These non-vehicle systems 80 may include workstations, personal computers, personal digital assistants, networks, pagers, televisions, radio receivers, telephones, and so on. The non-vehicle systems 80 may receive the data 50 in the same manner as the vehicles, i.e., by broadcast over a traffic message channel. Alternatively, the non-vehicle systems 80 may receive the data 50 by other means, such as over telephone lines, over the Internet, via cable, and so on. The systems in the vehicles 11 and the non-vehicle systems 80 that receive the data 50 may include various different computing platforms.

Figure 2:
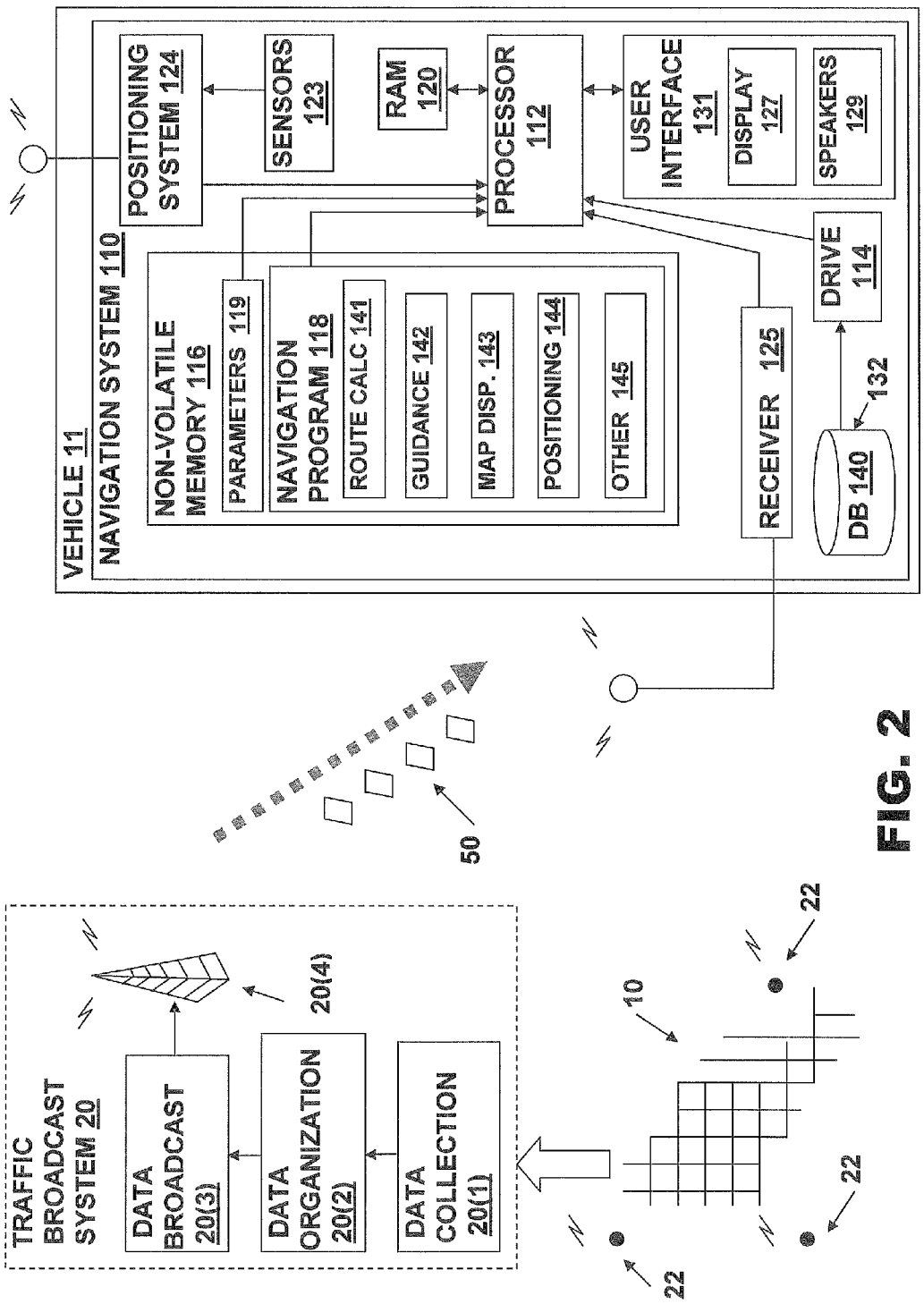
FIG. 2 is a block diagram illustrating components of the traffic broadcast system and one of the vehicles with an on-board navigation system, as shown in FIG. 1, according to an example.

FIG. 2 shows the components of the traffic broadcast system 20 and one of the vehicles 11 shown in FIG. 1. The traffic broadcast system 20 provides for the collection of data relating to traffic and road conditions, the analysis and organization of these collected data, the formatting of the analyzed data into traffic messages, and the transmission of these traffic messages to the vehicles 11 in the region 10 on a regular and continuing basis.

The traffic broadcast system 20 uses various means 22 to obtain information about traffic and road conditions. These means 22 may include sensors located in or near the roads in the road network 12, aerial sensors, sensors in vehicles 11, radar, as well as other technologies.

The traffic broadcast system 20 includes equipment and programming 20(1) for collecting the data relating to traffic and road conditions in the region 10 from the various sensors 22. This equipment and programming 20(1) includes, for example, various communications links (including wireless links), receivers, data storage devices, programming that saves the collected data, programming that logs data collection times and locations, and so on.

The traffic broadcast system 20 also includes equipment and programming 20(2) for assembling, organizing, analyzing, and formatting the collected traffic and road condition data. This programming and equipment 20(2) includes storage devices, programming that statistically analyzes the collected data for potential errors, programming that organizes the collected data, programming that uses the data to prepare messages in one or more appropriate predetermined formats.

The traffic broadcast system 20 also includes suitable equipment and programming 20(3) for broadcasting the data 50. The data 50 can be the traffic and road condition data collected and organized by the traffic broadcast system 20 and/or additional data, such as data included in sponsorship messages. The equipment and programming 20(3) includes interfaces to transmitters, programming that communicates formatted messages at regular intervals to the transmitters, and so on.

The traffic broadcast system 20 also includes transmission equipment 20(4). This equipment 20(4) may comprise one or more FM, AM, DAB, DRM or other transmitters, including antennas, or other wireless transmitters. This equipment 20(4) provides for broadcasting the formatted messages as data 50 throughout the region 10. The broadcasting equipment 20(4) may be part of the traffic broadcast system 20, or alternatively, the traffic broadcast system 20 may use broadcasting equipment from other types of systems, such as cellular or paging systems, FM radio stations, and so on, to broadcast the data 50 to the vehicles 11 in the region. The broadcasting of data 50 includes any form of transmission, including direct wireless transmission.

Figure 3:
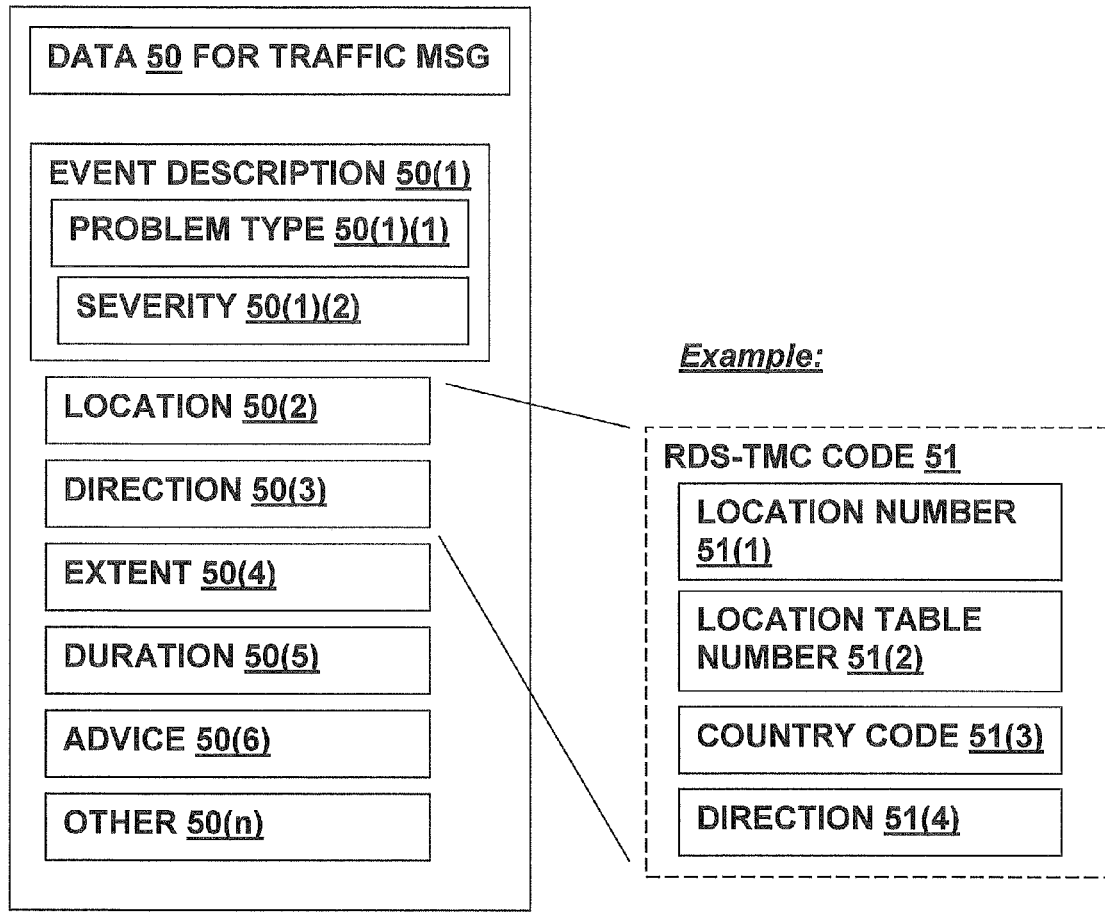
FIG. 3 is a diagram illustrating data included in a traffic message, according to an example.

FIG. 3 illustrates the data 50 for an example traffic message. The traffic message can include various kinds of data 50. One useful kind of information that the traffic message can include relates to traffic congestion. When used to provide information about traffic congestion, the traffic message includes data 50 that identify one or more locations along a road that are congested, how bad the congestion is, and how far the congestion extends. In the example shown in FIG. 3, the data 50 includes the following data components: an event description 50(1), a location 50(2), a direction 50(3), an extent 50(4), a duration 50(5), and advice 50(6). The data 50 for the traffic message may also include components that provide other information 50(n).

The event description component 50(1) includes data that describe a type of traffic problem 50(1)(1) along with data that describe a level of severity 50(1)(2) of the traffic problem. The location component 50(2) includes a reference number that identifies the location of the traffic problem. The direction component 50(3) includes data that indicate the direction of traffic affected. The extent component 50(4) includes data that identify a length of a traffic congestion queue with respect to the location 50(2). The extent component 50(4) implicitly defines another (e.g., a secondary location) straddling the traffic condition in terms of the number of location references in between. The advice component 50(6) provides a recommendation for a diversion of route.

According to this example, the data 50 conforms to the standard format for ALERT-C messages established in the RDS-TMC system. For example, in the RDS-TMC system, the location 50(2) component of the data 50 is included in a RDS-TMC code 51. The RDS-TMC code 51 includes a location number 51(1), a location table number 51(2), a country code 51(3), and a direction 51(4). The location number 51(1) is a unique number within a region to which one location table (i.e., a database of numbers) corresponds. The location table number 51(2) is a unique number assigned to each separate location table. The country code 51(3) is a number that identifies the country in which the location referenced by the location number 51(1) is located. The direction 51(4) takes into account factors such as bi-directionality and whether or not the segments are external to the junction. The RDS-TMC code 51 is formatted as a string as follows:

ABBCCCCCDE where:

A: Country Code (country code 51(3))
BB: Location Table Number (location table number 51(2))
CCCCC: Location Code (location number 51(1))
D: RDS Direction (+, −) (direction 51(4))
E: Extent (offset from the location in the direction indicated).

The vehicles 11 in the region 10 that have appropriate equipment installed in them can receive these traffic messages. These messages can be provided to the drivers or passengers in the vehicles 11.

While the RDS-TMC ALERT-C message format was used in this example traffic message, it is understood that similar messages can be sent using the appropriate message formats for other traffic broadcasting systems.

II. Navigation System Overview

FIG. 2 also depicts the components of one of the vehicles 11 shown in FIG. 1. The vehicle 11 may be a car, a truck, a motorcycle, or any other type of vehicle in the region 10. A navigation system 110 is installed in the vehicle 11. The navigation system 110 is a combination of hardware and software components. In one embodiment, the navigation system 110 includes a processor 112, a drive 114 connected to the processor 112, and a non-volatile memory storage device 116 for storing a navigation application software program 118 and possibly other information. The processor 112 may be any type of processor suitable for navigation systems.

The navigation system 110 may also include a positioning system 124. The positioning system 124 may utilize GPS-type technology, a dead reckoning-type system, or combinations of these or other systems, all of which are known in the art. The positioning system 124 may include suitable sensing devices 123 that measure the traveling distance, speed, direction, and so on, of the vehicle 11. The positioning system 124 may also include appropriate technology to obtain a GPS signal, in a manner which is known in the art. The positioning system 124 outputs a signal to the processor 112. The signal from the positioning system 124 may be used by the navigation application software 118 that is run on the processor 112 to determine the location, direction, speed, and so on, of the vehicle 11.

The vehicle 11 includes a traffic message receiver 125. The receiver 125 receives the data 50 from the traffic broadcast system 20. For example, the receiver 125 may be an FM receiver tuned to the appropriate frequency at which the traffic broadcast system 20 is using to broadcast the data 50. As another example, when the data 50 are sent by direct wireless transmission, such as cellular wireless transmission, the receiver 125 in the vehicle 11 may be similar or identical to a cellular telephone. The receiver 125 provides an output to the processor 112 so that appropriate programming in the navigation system 110 can utilize the data 50 broadcast by the traffic broadcast system 20 when performing navigation functions.

Figure 4:
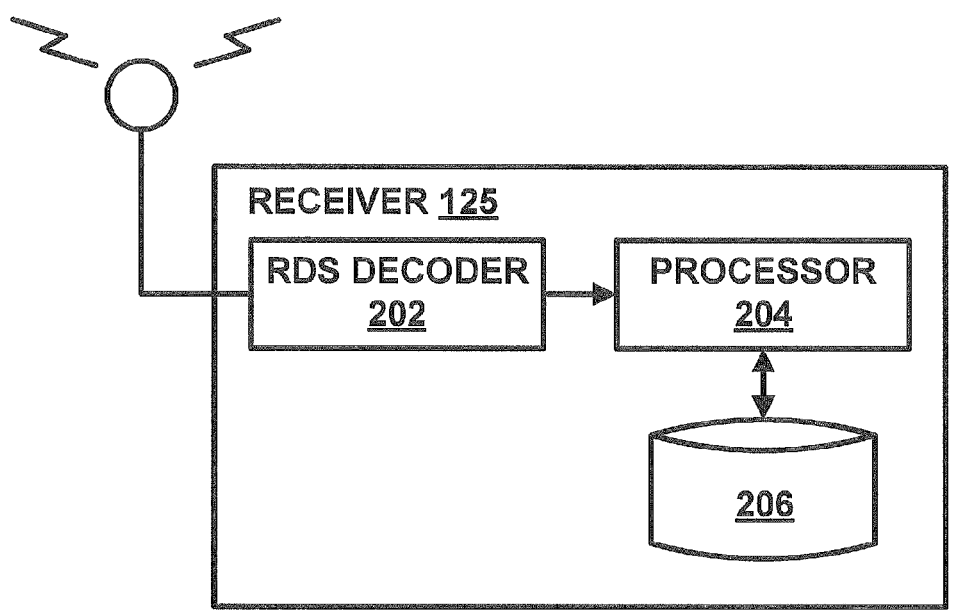
FIG. 4 is a block diagram illustrating a receiver, as shown in FIG. 2, according to an example.

FIG. 4 is a simplified block diagram of the traffic message receiver 125 that may be used in the navigation system 110 depicted in FIG. 2. In this example, the receiver 125 is an RDS receiver. However, receiver design depends on the type of traffic broadcast system 20 transmitting the data 50 and, thus, the receiver 125 is not limited to any particular type of receiver. The receiver 125 includes an RDS decoder 202 that receives and formats the data 50. The RDS decoder 202 provides the formatted data to a processor 204. The processor 204 interprets the data and determines what action to take based on the data. For example, the processor 204 may read data from or write data to memory 206. The memory 206 is not limited to any memory type.

While FIG. 4 depicts the receiver 125 having its own processor 204 and memory 206, it is understood that the receiver 125 may share processing and memory with the navigation system 110 (i.e., an integrated system). For example, the receiver 125 may use the processor 112 and the non-volatile memory 116. Moreover, the receiver 125 may have additional components not depicted in FIG. 4.

Returning to FIG. 2, the navigation system 110 also includes a user interface 131. The user interface 131 includes appropriate equipment that allows the end-user (e.g., the driver or passengers) to input information into the navigation system 110. This input information may include a request to use the navigation features of the navigation system 110. For example, the input information may include a request for a route to a desired destination, such as a point of interest. The input information may also include requests for other kinds of information. The user interface equipment used to input information into the navigation system 110 may include a keypad, a keyboard, a microphone, and so on, as well as appropriate software, such as a voice recognition program. The user interface 131 also includes suitable equipment that provides information back to the end-user. This equipment may include a display 127, speakers 129, and other communication means.

The navigation system 110 uses a map database 140 stored on a storage medium 132. The storage medium 132 is installed in the drive 114 so that the map database 140 can be read and used by the navigation system 110. The storage medium 132 may be removable and replaceable so that a storage medium with an appropriate map database for the geographic region in which the vehicle is traveling can be used. In addition, the storage medium 132 may be replaceable so that the map database 140 on it can be updated easily. In one embodiment, the geographic data 140 may be a geographic database published by NAVTEQ North America, LLC of Chicago, Ill.

In one embodiment, the storage medium 132 is a CD ROM disk. In an alternative embodiment, the storage medium 132 may be a PCMCIA card in which case the drive 114 would be substituted with a PCMCIA slot. Various other storage media may be used, including fixed or hard disks, DVD disks, or other currently available storage media, as well as storage media that may be developed in the future. The storage medium 132 and the geographic database 140 do not have to be physically provided at the location of the navigation system 110. In alternative embodiments, the storage medium 132, upon which some or all of the geographic data 140 are stored, may be located remotely from the rest of the navigation system 110 and portions of the geographic data provided via a communications link, as needed.

In one type of system, the navigation application software program 118 is loaded from the non-volatile memory 116 into a Random Access Memory ("RAM") 120 associated with the processor 112 in order to operate the navigation system 110. The processor 112 also receives input from the user interface 131. The input may include a request for navigation information. The navigation system 110 uses the map database 140 stored on the storage medium 132, possibly in conjunction with the outputs from the positioning system 124 and the receiver 125, to provide various navigation features and functions.

The navigation application software program 118 may include separate applications (or subprograms) that provide these various navigation features and functions. These functions and features may include route calculation 141 (wherein a route to a destination identified by the end-user is determined), route guidance 142 (wherein detailed directions are provided for reaching a desired destination), map display 143, and vehicle positioning 144 (i.e., map matching). Other functions and programming 145, in addition to these, may be included in the navigation system 110. The navigation application program 118 may be written in a suitable computer programming language such as C, although other programming languages, such as C++ or Java, are also suitable.

Figure 5:
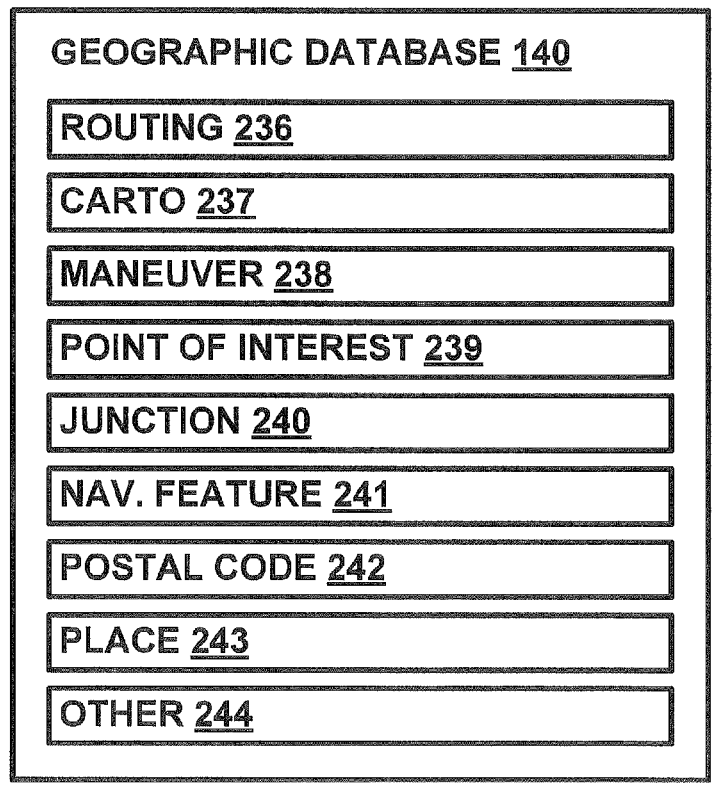
FIG. 5 is a block diagram illustrating an organization of the geographic database, as shown in FIG. 2, according to an example.

FIG. 5 is a block diagram showing an example organization of the geographic database 140 depicted in FIG. 2. In this example, the geographic database 140 is organized by data type. One way that the accessing of geographic data can be enhanced for performing various navigation functions is to provide separate collections or subsets of the geographic data 140 for use by each of the separate functions (e.g., 141-145) in the navigation application program 118. Each of these separate subsets is tailored specifically for use by one of the functions.

For instance, the route calculation function 141 (in FIG. 2) normally requires only a portion of all the information in the geographic database that is associated with a segment of a road. When the route calculation function 141 is being run, it may require information such as the speed along a road segment, turn restrictions from one road segment to another, and so on. However, the route calculation function 141 does not necessarily require the name of the road to calculate a route.

Similarly, when the route guidance function 142 is being run, some of the information associated with a segment of a road, such as the speed and turn restrictions, is not required. Instead, when the route guidance function 142 is being run, it uses information that includes the name of the road represented by the road segment, the address range along the road segment, any signs along the road segment, and so on.

Even further, when using the map display function 143, some of the information associated with a road segment, such as the speed limits or turn restrictions, is not required. Instead, when the map display function 143 is run, it uses only a portion of the information associated with the road segment, such as the shapes and locations of roads, and possibly the names of the roads.

Although there may be some overlap as to the types of information used by the various navigation functions, some of the data used by these navigation functions is only used by one of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

In order to provide the information in the geographic database 140 in a format more efficient for use by each of the navigation functions, separate subsets of the entire geographic database 140 for a given geographic region are provided for each of the different types of navigation functions to be provided in the navigation application program 118. FIG. 5 illustrates the geographic database 140 comprised of separate routing data 236 (for route calculation), cartographic data 237 (for map display), maneuver data 238 (for route guidance), point-of-interest data 239 (for identifying specific points of interest, such as hotels, restaurants, museums, stadiums, airports, etc.), and junction data 240 (for identifying named intersections).

In addition to these types of data, the geographic database 140 may include navigation feature data 241. This subset of data includes names of navigable features (such as roads). The geographic database may also include data subsets for postal codes 242 and places 243 (e.g., cities, states, and counties). The geographic database 140 may not include all of these subsets. Moreover, the geographic database 140 may include other subsets of data 244.

III. Providing Sponsorship Information Alongside Traffic Messages

It would be desirable to provide sponsorship information, such as advertisements, sponsor names, and other information regarding the sponsors and their products and/or services, to end-users of the traffic message receiver 125 alongside the traffic message channel. To provide this sponsorship information, the traffic broadcast system 20 transmits sponsorship messages as a secondary (or background) routine to the system's primary (or regular) transmission of traffic messages. The traffic message receiver 125 receives the sponsorship messages and stores the data in these messages in the receiver's memory 206.

This background routine may operate in a substantially continuous manner so that over time the receiver's memory 206 contains continually updated sponsorship data. The traffic broadcast system 20 may transmit the sponsorship messages at a slower rate than the traffic messages so that the continual updating of the receiver memory 206 does not interfere with the transmission of traffic information. Additionally, the traffic broadcast system 20 may transmit the sponsorship messages when the traffic broadcast system 20 does not have a traffic message to broadcast. For example, if the traffic broadcasting system 20 typically broadcasts one hundred traffic messages every five minutes in a market and only fifty traffic messages are available, the traffic broadcasting system 20 may transmit sponsorship messages in the available bandwidth. The traffic broadcasting system 20 may also limit the number of sponsorship messages transmitted during a period of time.

Upon detection of a triggering event, the traffic message receiver 125 provides sponsorship information to end-users using the stored sponsorship data. The triggering event may be an action undertaken by the user, such as entering a point of interest string into the user interface 131 of the navigation system 110, a trigger flag sent in a message to the receiver 125, or another triggering event, such as the time of day, day of the week, and the location of the receiver 125. As a result, the end-user can receive sponsorship information without any modifications to the receiver 125 and without impacting the original purpose of the receiver 125, namely providing the end-user with current reports of traffic and road conditions.

The following is a description of one example of how to provide sponsorship information alongside the traffic messages to end-users of a traffic message receiver. By "alongside" it is meant that the traffic messages and the sponsorship messages use different protocols, but co-exist within the same transmission. In this example, the protocol used for the traffic messages is the RDS-TMC protocol (described in EN ISO 14819-1, -2, -3, -6: 2002), which is used on both RDS and RBDS systems, and the protocol used for the sponsorship messages is a proprietary protocol. The proprietary protocol is recognized by the traffic message receiver 125 by registering the protocol as an Open Data Application ("ODA") as described in the RDS/RBDS standard. Upon registration, an application identifier ("AID") is assigned to the protocol. The receiver 125 recognizes the application identifier without modifying the receiver 125.

The invention is not limited to these protocols. The general concepts of using a background routine for storing the sponsorship data on the traffic message receiver and using a triggering event for providing the sponsorship information to a user of the receiver apply to other traffic broadcast protocols and transmitted on different bearers such as FM, AM, VICS, DAB, DRM, DMB, HD Radio, and so on.

FIG. 6 depicts a message format 300 that is used to store sponsorship information in the memory 206 of the receiver 125. The message format 300 is also used for triggering the receiver 125 to send sponsorship information to the user via the user interface 131. Preferably, the traffic broadcast system 20 transmits data using the message format 300 in a repetitive and cyclical manner. In this way, the receiver's memory 206 is updated in a substantially continuous manner. For example, the messages may be transmitted every 28 RDS groups (i.e., 1 group/2.5 seconds).

As shown in FIG. 6, the message format 300 follows the type 12 A group format as described in the RDS/RBDS standard. However, any Open Data Application group that is available (i.e., not already assigned to a standard application) may be used for the message format 300. The message format 300 includes thirty-seven bits identified as x4-x0, y15-y0, and z15-z0 in FIG. 6. The message bits that contain "rfu" are reserved for future use.

Bits x4-x3 represent a message type 302. When x4 and x3 both contain a logic-0 value, the message type 302 is "sponsor." A sponsor message is a search string having up to sixteen characters. The search string includes a name of a sponsor for a sponsorship message, such as McDonald's, Starbucks, and Shell. A sponsor is any company or individual (i.e., a party) that would like to send information to an end-user of the traffic message receiver 125. The actual sponsor message is located in the character bits 310 (i.e., y7-y0 and z15-z0) of the message format 300. Sponsors may be updated on a regular basis, such as weekly or monthly, and sponsors may be active for different time periods, sometimes referred to as "timeslots."

When x4 contains a logic-0 value and x3 contains a logic-1 value, the message type 302 is "text." A text message is a sponsorship message in text format having up to thirty-two characters. The text is represented by a six-bit code. Preferably, a reduced ASCII character set is used. For example, the text sponsorship message may be "ENJOY A BIG MAC TODAY." The actual text sponsorship message is located in the character bits 310.

When x4 contains a logic-1 value and x3 contains a logic-0 value, the message type 302 is "phoneme." A phoneme message is a sponsorship message in phoneme format having up to thirty-two "characters." The phoneme is represented by a six-bit code. Preferably, the NT-SAMPA phoneme standard is used. The actual phoneme sponsorship message is located in the character bits 310.

When x4 and x3 both contain a logic-1 value, the message type 302 is undefined. As the message type is undefined, the remaining bits in the message are reserved for future use (rfu).

For the sponsor message type 302, bits x0, y15 include count data 304. For the text and phoneme message types 302, bits x1, x0, and y15 include the count data 304. The count data 304 identifies the character slots for the sponsor, text, and phoneme message types. For example, the count data 304 consisting of binary 000 identifies character slots 1, 2, 3, 4; the count data 304 consisting of binary 001 identifies character slots 5, 6, 7, 8; and so on.

Bits y14-y11 include a point of interest ("POI") identifier 306. The point of interest identifier 306 identifies a point of interest category, such as restaurants, movie theaters, hotels, and so on. Up to sixteen point of interest categories are available per transmission.

Bits y10-y8 include a sponsor identifier 308. The sponsor identifier 308 identifies which sponsor in the point of interest category is currently being described. As there are three bits used, it follows that for each of the sixteen possible point of interest categories there can be eight sponsors. Each of these sponsors (a total possible of eight sponsors for sixteen point of interest categories) may be stored in the receiver's memory 206. Only one sponsor for each point of interest category is active at any one time, the active sponsor being indicated by the transmission of the active sponsor identifier 328 appropriate to each point of interest category identifier 326 in the type 3 A group, described below.

Assuming that the sponsor message is sixteen characters and the text or phoneme message is thirty-two characters, a total of forty-eight characters are sent to the receiver 125. for each sponsor. If four characters are sent per group, twelve groups are sent to the receiver 125 to provide a complete sponsorship information update. To improve the possibility of the update being received, each group may be sent twice, before moving to the next point of interest category and sponsor. In this redundancy example, each active point of interest sponsor requires twenty-four groups for an update.

At any one time there is one active sponsor for each of the up to sixteen point of interest categories; hence, cycle time for the active sponsor in each of the sixteen point of interest categories is approximately sixteen minutes. If phonemes are also required, the cycle time increases to approximately twenty-four minutes. This is worst-case, with all sponsor messages for the active sponsor being sixteen characters and both the text and phoneme messages requiring thirty-two characters. In practice, the expected cycle times are closer to ten minutes for text only and sixteen minutes with text and phonemes, as few sponsorship messages will require the maximum of sixteen character sponsor message and thirty-two characters each for text and phoneme messages.

FIG. 7 depicts a message format 320 that is used to identify the specific group type used by the registered Open Data Application. The message format 320 is also used for indicating which sponsor in each point of interest category is currently active and triggering the receiver 125 to send sponsorship information to the user. Preferably, the traffic broadcast system 20 transmits data 50 using the message format 320 every 7.5 seconds; however, other transmission schedules (both regular and irregular) may also be used. At one group per seven-and-one-half-seconds, the receiver 125 is updated as to which sponsor is active in each category every two minutes.

The message format 320 follows the type 3 A group format as described in the RDS/RBDS standard. The type 3 A group conveys to the receiver 125 information about which Open Data Applications are carried on a particular transmission and in which groups they will be found. The message format 320 includes an Application Group Type code 322 (x4-x0), an Applications Identification (AID) code 332 (z15-z0), and message bits 324-330 (y15-y0).

The Application Group Type code 322 indicates the group type used, in a particular transmission, to carry the specified Open Data Application. The first four bits (x4-x1) identifies the group type code, while the fifth bit (x0) identifies the group type version. In the example depicted in FIG. 7, the Application Group Type code 322 defines Open Data Application group 12 A, which corresponds to the Open Data Application group format depicted in FIG. 6.

The Applications Identification code 332 is a unique value that identifies a registered Open Data Application. After the receiver 125 receives a message with the type 3 A group format specifying the Applications Identification code 332, the receiver 125 recognizes messages having the Application Group Type code 322. Otherwise, the receiver 125 ignores these messages. In this example, the Applications Identification 332 is Hex C3C3, which was issued to NAVTEQ LLC on Feb. 15, 2007.

The message bits 324-330 contain the Open Data Application. In the example depicted in FIG. 7, the message bits include a trigger flag 324 (y15), a point of interest identifier 326 (y14-y11), an active sponsor identifier 328 (y10-y8), and a market identifier 330 (y7-y0).

The trigger flag 324 is a single bit that identifies when to provide sponsorship information to the end-user of the receiver 125. Either a logic-0 or a logic-1 value (or a transition to a logic-0 or a logic-1 value) can be used as a triggering event. When the trigger flag 324 is set, a sponsorship message is triggered and presented to the end-user as described with respect to FIG. 9.

The point of interest identifier 326 identifies a point of interest category, such as restaurants, movie theaters, hotels, and so on. Up to sixteen point of interest categories are available per transmission. The active sponsor identifier 328 identifies what sponsor is active for the point of interest category identified by the point of interest identifier 326. Up to eight different sponsors are available for each point of interest category. The market identifier 330 identifies a market. Up to 256 markets can be defined. A market may be defined as a country, a region, a state, a city, a neighborhood, and so on. Alternatively, a market may be based on the Arbitron list of radio station markets (i.e., 1. New York; 2. Los Angeles; 3. Chicago; . . . ). The receiver 125 may store sponsor records for up to 256 unique markets if memory allows, but generally sponsor records will be stored for two or three markets (e.g., a commuters 'home' market and the markets to which he commutes).

Upon receipt of the trigger flag 324, receivers 125 in the market identified in the market identifier 330 provide sponsorship information for the sponsor identified in the active sponsor identifier 328 for the point of interest category identified by the point of interest identifier 326. Sponsors can schedule a time slot for when they want particular sponsorship information provided to particular receivers located in a selected market. According to time of day, it is only necessary to change the value of the active sponsor identifier 328 to cause a different sponsor to be presented and there is no requirement for any data records in memory to be changed. The active sponsor identifier 328 causes the time appropriate sponsor record to be extracted from memory and presented.

Figure 8:
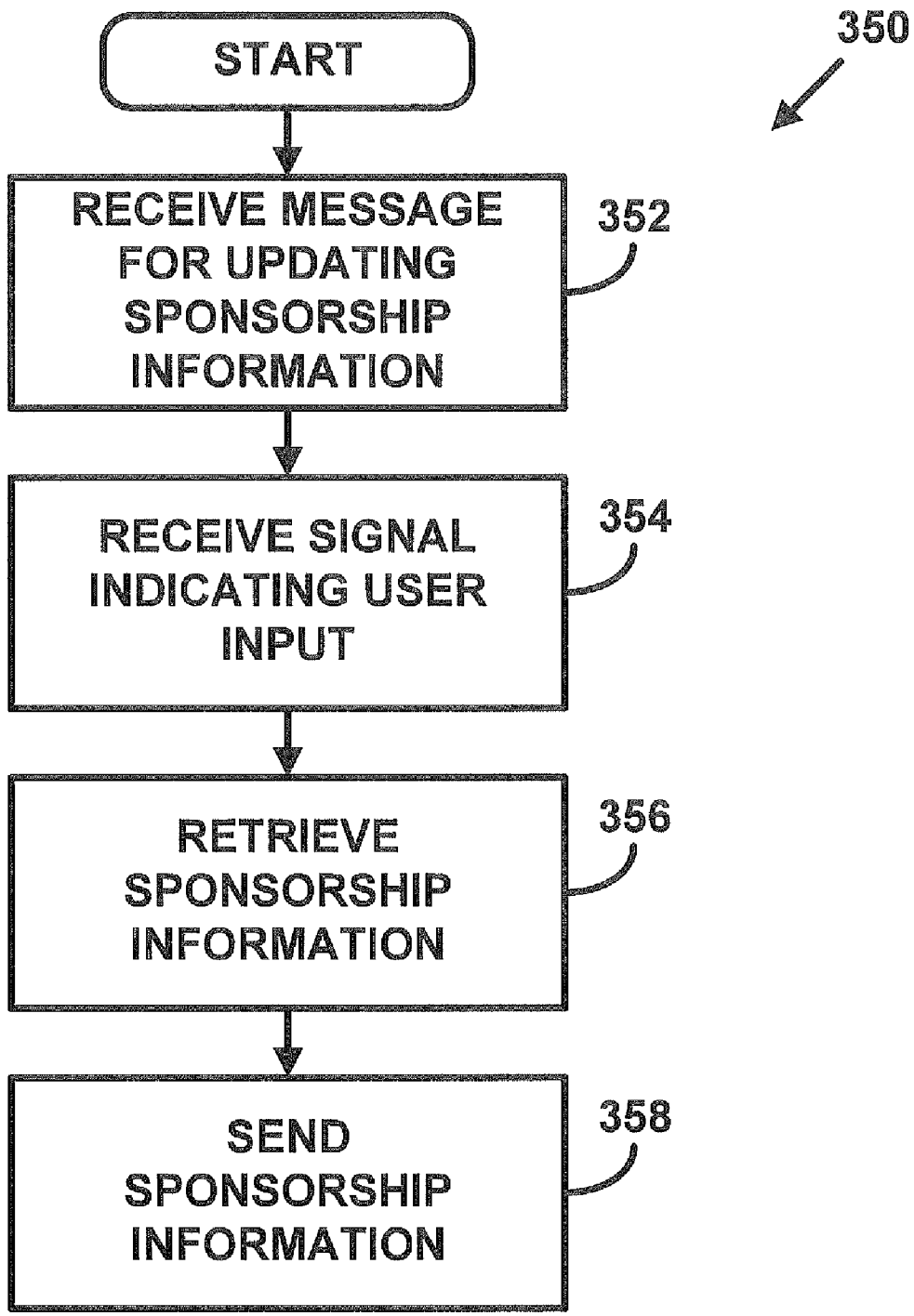
FIG. 8 is a flowchart of a method for providing sponsorship information when triggered by user action, according to an example.

FIG. 8 is a flowchart of a method 350 for providing sponsorship and other information using traffic channels. At block 352, the receiver 125 receives messages for updating sponsorship information stored in the receiver's memory 206. As described with reference to FIG. 6, sponsor identification and sponsorship messages (e.g., advertisements and other information) are transmitted to the receiver 125. The messages also identify the message type 302, the count data 304, the point of interest identifier 306, and the sponsor identifier 308. This information is stored in the memory 206 of the receiver 125. The memory 206 is updated with new data only infrequently when a new sponsor is required, or an existing sponsor wished to change their advertising text or phoneme.

At block 354, an end-user's input to the navigation system 110 triggers a sponsorship message. For example, when the end-user searches for a point of interest using the navigation system 110, a sponsorship message may be triggered. Other user inputs and/or mechanisms may also be used to trigger a sponsorship message, such as the location of the navigation system 110 as determined by the positioning system 124, the time of day, the day of the week, the type of the vehicle 11 or the navigation system 110, the expected demographics of the user, and any combination of these triggers.

At block 356, the receiver 125 retrieves the appropriate sponsorship data from the memory 206 based on what sponsor is active for a point of interest category associated with the entered point of interest string. A sponsor may schedule when, what markets, and for what point of interest categories to provide the sponsorship information. The receiver 125 uses the stored sponsor identifier data to determine what sponsor is active for the point of interest category. The active sponsor's sponsorship information is retrieved from the receiver's memory 206. The sponsorship information may be any information that the sponsor wants to provide an end-user interested in the entered point of interest.

At block 358, the retrieved sponsorship information is sent to the end-user. The sponsorship information is presented verbally and/or textually by the navigation system's user interface 131. Additionally or alternatively, the location(s) of the active sponsor in the current market are identified on a map presented on the display 127 using the end-user's search string for the point of interest.

Figure 9:
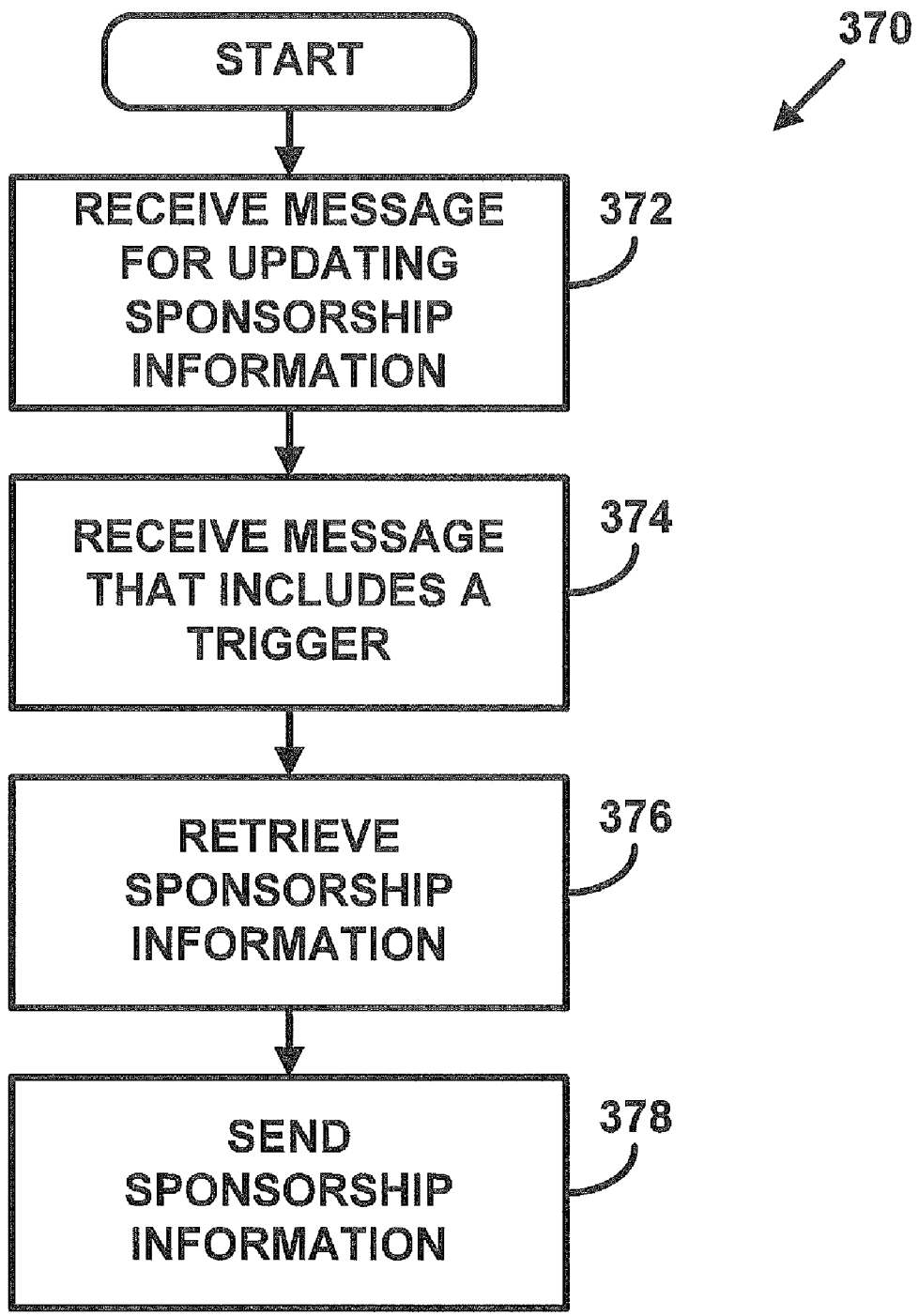
FIG. 9 is a flowchart of another method for providing sponsorship information when triggered by an over-the-air signal, according to an example.

FIG. 9 is a flowchart of a method 370 for providing sponsorship and other information using traffic channels. The method 370 is similar to the method 350, but uses a different triggering mechanism for providing sponsorship information to an end-user of a traffic message receiver. At block 372, the receiver 125 receives messages for updating sponsorship information stored in the receiver's memory 206 as described with reference to block 352 depicted in FIG. 8.

At block 374, the receiver 125 receives a message triggering a sponsorship message. As described with reference to FIG. 7, a message bit (y15) is assigned as the trigger flag 324. The receiver 125 recognizes when the trigger flag 324 is set. This triggering mechanism may be described as an over-air trigger.

At block 376, the receiver 125 retrieves the appropriate sponsorship data from the receiver's memory 206. The receiver 125 selects the sponsorship data based on the point of interest category identified in the point of interest identifier 326, the active sponsor identified in the active sponsor identifier 328, for the market identified in the market identifier 330 of the triggering message. The sponsorship information may be any information that the sponsor wants to provide an end-user of the receiver 125.

At block 378, the retrieved sponsorship information is sent to the end-user. The sponsorship information is presented verbally and/or textually by the navigation system's user interface 131. Additionally or alternatively, the location(s) of the active sponsor in the current market are identified on a map presented on the display 127.

By using an Open Data Application for delivering sponsorship information to the receiver 125, the sponsorship information can be provided to end-users regardless to the user's location on a road network. Instead, the sponsorship information can be delivered based on a broadcast market and/or an entered point of interest. Moreover, the sponsorship information can be delivered without any modifications to the receiver 125.

As an additional benefit, the amount of data to be stored in the traffic message receiver's memory 206 is minimal. As described with reference to FIG. 6, the necessary capacity of the memory 206 may be less than 32 k bytes. For the example, 80 characters (16 search string, 32 text, 32 phoneme) for 16 point of interest categories, with 8 sponsors for category in four markets results in 40,960 characters (6 bits/character), which results in data storage requirements of less than 32 k bytes. Of course memory requirements may change based on the number of characters, categories, sponsors, and total markets actually stored.

While the example was described using the RDS/RBDS standard, it is understood that other traffic broadcast system standards may also be used to store sponsorship information on a traffic message receiver and then present the appropriate information to the receiver's end-user based on sponsor selected time-slots. It is also understood that stream, packet, and other data transmission formats may be used to transmit data to the receiver. It is also understood that data having other data formats, including video and audio, may be stored on and retrieved from the receiver. The sponsorship messages are not limited to a text or phoneme data format.

In addition, the sponsorship messages may include any type of information that the sponsor would like to provide to the receiver's end user and is not limited to advertising. Moreover, the sponsor may target sponsorship messages to particular types of traffic message receivers. For example, a car manufacturer may send a recall or other safety related message to all traffic message receivers installed in that manufacturer's cars. Additionally, the sponsorship message may include information that allows the sponsor to determine whether the end-user received the sponsorship information. For example, the sponsorship message may include a code word, phrase, or image that the end-user may present at a sponsor location to receive a discount.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of providing sponsorship information to an end-user of a traffic message receiver, comprising:
    receiving a first message at the traffic message receiver that causes the traffic message receiver to recognize a second message;
    receiving the second message having data representing sponsorship information; and
    storing the data representing the sponsorship information in memory of the traffic message receiver.

2. The method of claim 1, wherein the first message conforms to a traffic message broadcasting standard.

3. The method of claim 1, wherein the second message conforms to a proprietary protocol that co-exists within the same transmission as the first message.

4. The method of claim 1, further comprising providing the sponsorship information to the end-user of the traffic message receiver upon identification of a triggering event.

5. The method of claim 4, wherein the triggering event is the end-user entering a point of interest string into the user's navigation system.

6. The method of claim 4, wherein the triggering event is receiving a third message that includes a trigger flag.

7. The method of claim 4, wherein the triggering event is a location of the traffic message receiver at a particular time.

8. A method of providing sponsorship information to a user of a traffic message receiver, comprising:
    obtaining an identifier to include in a first message that causes the traffic message receiver to recognize the first message;
    sending the first message with the identifier to the traffic message receiver, wherein the first message causes the traffic message receiver to recognize a second message; and
    sending the second message to the traffic message receiver, wherein the second message includes data representing information that a party wants to provide to a user of the traffic message receiver.

9. The method of claim 8, wherein the identifier is an application identifier of an Open Data Application.

10. The method of claim 8, wherein the first message conforms to a traffic message broadcasting standard.

11. The method of claim 8, wherein the second message conforms to a proprietary protocol that co-exists within the same transmission as the first message.

* * * * *